(12) United States Patent
Gislason

(10) Patent No.: US 7,284,101 B2
(45) Date of Patent: Oct. 16, 2007

(54) RELIABLE FILE SYSTEM AND METHOD OF PROVIDING THE SAME

(75) Inventor: Drew Gislason, Friday Harbor, WA (US)

(73) Assignee: Datalight, Inc., Bothell, WA (US)

( * ) Notice: Subject to any disclaimer, the term of this patent is extended or adjusted under 35 U.S.C. 154(b) by 487 days.

(21) Appl. No.: 10/911,820

(22) Filed: Aug. 4, 2004

(65) Prior Publication Data

US 2006/0031269 A1 Feb. 9, 2006

(51) Int. Cl.
*G06F 12/00* (2006.01)
(52) U.S. Cl. .................................. 711/156; 707/203
(58) Field of Classification Search ............... 711/156, 711/162; 707/203, 202, 2
See application file for complete search history.

(56) References Cited

U.S. PATENT DOCUMENTS

| | | | |
|---|---|---|---|
| 4,901,231 A | 2/1990 | Bishop | |
| 5,504,883 A | 4/1996 | Coverston | |
| 5,761,677 A | 6/1998 | Senator | |
| 5,828,876 A | 10/1998 | Fish | |
| 5,875,444 A | 2/1999 | Hughes | |
| 5,946,686 A | 8/1999 | Schmuck | |
| 5,991,862 A | 11/1999 | Ruane | |
| 6,038,570 A | 3/2000 | Hitz | |
| 6,044,377 A | 3/2000 | Gavaskar | |
| 6,138,126 A | 10/2000 | Hitz | |
| 6,353,837 B1 | 3/2002 | Blumenau | |
| 6,493,804 B1 | 12/2002 | Soltis | |
| 6,571,261 B1 | 5/2003 | Wang-Knop | |
| 6,615,224 B1 | 9/2003 | Davis | |
| 6,636,879 B1 | 10/2003 | Doucette | |
| 6,640,233 B1 | 10/2003 | Lewis | |
| 6,643,654 B1 | 11/2003 | Patel | |
| 6,654,772 B1 | 11/2003 | Crow | |
| 2002/0078239 A1 | 6/2002 | Howard | |
| 2002/0078244 A1 | 6/2002 | Howard | |
| 2002/0083037 A1 | 6/2002 | Lewis | |
| 2002/0091670 A1 | 7/2002 | Hitz | |
| 2002/0112022 A1 | 8/2002 | Kazar | |
| 2002/0136406 A1 | 9/2002 | Fitzhardinge | |
| 2002/0138502 A1 | 9/2002 | Gupta | |
| 2002/0161911 A1 | 10/2002 | Pinckney, III | |
| 2003/0158836 A1 | 8/2003 | Venkatesh | |
| 2003/0158863 A1 | 8/2003 | Haskin | |
| 2003/0158873 A1 | 8/2003 | Sawdon | |
| 2003/0159007 A1 | 8/2003 | Sawdon | |
| 2003/0182253 A1 | 9/2003 | Chen | |
| 2003/0182313 A1 | 9/2003 | Federwisch | |
| 2003/0182317 A1 | 9/2003 | Kahn | |
| 2003/0182389 A1 | 9/2003 | Edwards | |
| 2003/0191745 A1 | 10/2003 | Jiang | |
| 2003/0195903 A1 | 10/2003 | Manley | |
| 2005/0027748 A1 | 2/2005 | Kisley | |

*Primary Examiner*—Jack Lane
(74) *Attorney, Agent, or Firm*—Christensen O'Connor Johnson Kindness PLLC

(57) ABSTRACT

A reliable file system method and system are provided. The reliable file system substantially ensures that an on-media state of a file system is maintained while another working-media state of the file system is modified. At a transaction point, issued by a computer system associated with the file system, the working-media state of the file system is written completely to non-volatile storage associated with the file system. Once the write process is complete, the on-media state of the file system is updated.

21 Claims, 5 Drawing Sheets

RELIABLE FILE SYSTEM AND METHOD OF PROVIDING THE SAME

FIELD OF THE INVENTION

The present invention generally relates to computer systems and computer-related devices, and more particularly, the present invention generally relates to storage and memory devices associated with computer systems and computer-related devices.

BACKGROUND OF THE INVENTION

Modern life is becoming more dependent upon computers. Computers have evolved into extremely sophisticated devices, and may be found in many different applications. These applications involve everything from application-specific computers found in everyday devices such as automobiles, phones, and other electronics, to the general purpose computers found in the form of personal digital assistants (PDAs), personal computers, servers, and mainframes.

One of the main components in modern computer systems is memory. Many types of different memory products are currently used in computer systems. Most memory used in computer systems is volatile, meaning that it requires power to store information. If the power is turned off, the information stored in the volatile memory is lost. In certain applications, some or all of the memory in the computer system should be able to retain the information even when power is off or disconnected. For these applications, a non-volatile storage is used to store information that generally may not be lost when the power is turned off or disconnected.

One type of non-volatile storage is called "flash" memory. Flash memory is used in a wide variety of applications, such as storing control code in computer systems. In flash memory, an electronic charge is stored on a floating gate in each cell of the memory, with the level of the electronic charge determining the value for that cell. The flash memory is generally organized so that a section of memory cells is erased in a single action or "flash." This erasing technique uses tunneling in which electronics pierce through a thin dielectric material to remove the electronic charge from the floating gate associated with each memory cell.

Another type of non-volatile storage is the conventional disk drive. The conventional disk drive is in an electromechanical device that includes one or more flat circular disks designed to rotate rapidly around a central axis. Each of these flat disks has opposite surfaces which are coated with some form of magnetic material. A mechanical arm driven by one or more electrical signals places a magnetic head over each side of each disk to write to positions on the disk or to read from those positions. These positions lie in sectors, a number of which form one complete track on one side of a disk. Each sector is capable of storing a fixed amount of data. This data is typically 512 bytes; however, larger byte sectors may also be used on some disks. Depending on formatting, a single side of a disk may have over 600 tracks. A typical disk drive used in a computer system or other computer-related device is capable of storing well over 30 gigabytes of data.

As is conventionally known, most memories and disk drives associated with computer systems or other computer-related devices include the use of file systems. The important feature of these file systems relates to logical data organization and therefore file reliability. More particularly, it is important that these file systems, regardless of the type of memory or storage they reside on, remain substantially immune to system failure, such as crashes, power failures, etc.

SUMMARY OF THE INVENTION

At least one exemplary embodiment of the present invention provides a reliable file system. The reliable file system substantially ensures that an on-media state of the file system is maintained while another working-media state of the file system is modified. At a transaction point, issued by a computer system associated with the file system, the working-media state of the file system is written completely to memory or storage associated with the file system. Once the write process is complete, the on-media state of the file system is updated. The complete write process, after a transaction point, is considered an atomic operation. This process of maintaining the file system helps to ensure loss of data does not occur.

One exemplary embodiment of the present invention provides a method of tracking changes that occur in a file system by way of a media status indicator; and maintaining another media status indicator having a known state of the file system until at least substantially all changes to the file system are accounted for by the media status indicator.

Yet another exemplary embodiment of the present invention provides an arrangement including a memory segment for tracking changes that occur in a file system by way of a media status indicator; and another memory segment for maintaining a known state of the file system until at least substantially all changes to the file system are accounted for by the memory segment for tracking changes that occur in the file system.

Another exemplary embodiment of the present invention provides a method that includes scanning a first metaroot and a second metaroot; designating one of the first and second metaroots as an on-media metaroot based on one of validity and which of the first and second metaroot is current; reading the on-media metaroot into volatile memory; designating the contents read into the volatile memory as a working-state metaroot; tracking changes that occur in a file system using the working-state metaroot; detecting a transaction point; committing changes tracked by the working-state metaroot to unallocated non-volatile storage; marking the working-state metaroot as current; and writing the working-state metaroot to an unused metaroot residing in non-volatile storage.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE EXEMPLARY EMBODIMENTS

Figure 1:
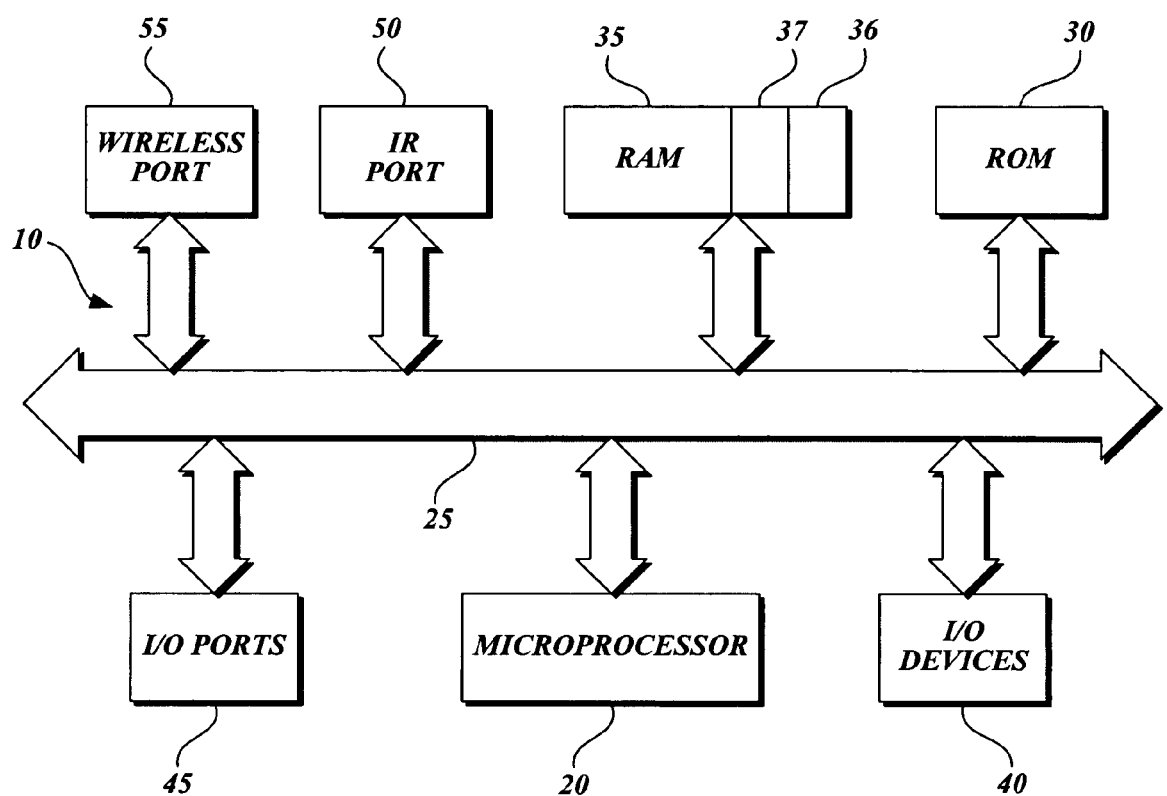
FIG. 1 is a block diagram illustrating a computer system with which an exemplary embodiment of the present invention may be used.

The exemplary embodiments of the present invention are best understood by referring to FIGS. 1-5 of the drawings, like numerals in the drawings being used for like and corresponding parts of the various drawings.

FIG. 1 is a block diagram illustrating a computer system 10 with which an exemplary embodiment of the present invention may be used. In the following description, the computer system 10 may be referred to a personal digital assistant (PDA). However, those of ordinary skill in the art will understand that the computer system 10 is being referenced as a PDA by way of example only. In particular, the computer system 10 may be a personal computer, laptop computer, tablet computer, handheld computer, wireless device, set-top box, digital camera, single-board computer, etc.

The PDA 10 includes a microprocessor 20 interconnected with one or more PDA 10 subset systems via a local interface 25. The local interface 25 may be one or more busses interconnected together to provide a conduit for signal flow. The microprocessor 20 may be interconnected to a non-volatile storage, such as a read-only memory (ROM) 30, and/or a volatile memory, such as a semiconductor random-access memory (RAM) 35, a dynamic random access memory, a flash electrically erasable programmable read-only memory, and/or other storage devices (36 and 37), via the interface 25. The ROM 30 may be used to store computer executable instruction sets, such as an operating system, an address book application, or another program that is typically included or used with the PDA 10.

User data, such as data entered through and input/output (I/O) device 40, such as a keyboard, a touch screen, and/or a keypad displayed on a display surface of the PDA 10, and/or programs installed in the PDA 10 by a user may be stored within the RAM 35 and are retrievable therefrom by the microprocessor 20. The I/O device 40, such as a touch screen, may be utilized to accept input from a user and to provide output to the user as well. Input may be provided to the I/O device by, for example, a stylus and a handwriting recognition algorithm maintained in the ROM 30 or the RAM 35. The algorithm is executable in the microprocessor 20.

The PDA 10 may further include one or more I/O ports 45 such as a serial port, a universal serial bus (USB) and/or another interconnecting port that facilitates exchange of communications between the PDA 10 and an external device. Such an external device may be another computer system, which via a cable may be connected to one of the I/O ports 45. Moreover, the I/O port 45 may be connected to a peripheral communication device, such as an external cable or a landline, or a wireless modem that enhances the communication capabilities of the PDA 10.

In addition to the above, the PDA 10 may include one or more wireless communication ports such as an infrared port 50 that includes an infrared transmitter and/or receiver that may facilitate exchange of information via infrared light to and/or from an infrared capable computer system. Moreover, a wireless port 55 may be included with the PDA 10. The wireless port 55 may facilitate the exchange of optic communications, radio frequency (RF) communications, or other electromagnetic communications between the PDA 10 and another wireless device and/or terrestrial device, such as a mobile terminal and/or another computer system interfacing with a wireless network. One such wireless network may include a wireless telephone network, or a localized wireless network commonly found in the corporate and residential environments.

As was discussed, the memory 35 and the additional memory components 36 and 37 may be any type of suitable volatile and/or non-volatile storage. This would include the various types of dynamic random access memory (DRAM) such as SDRAM, the various types of static RAM (SRAM), and the various types of non-volatile storage (PROM, EPROM, and flash). It should be understood that the memories 35, 36, and 37 may be a single-type memory component, or the memories 35, 36, and 37 may be composed of many different types of memory components and/or storage components. In addition, the illustrated computer system 10 along with the associated microprocessor 20 may be distributed across several different computers collectively operating in a contiguous manner. In at least one exemplary embodiment of the present invention, reference numeral 36 refers to a flash memory and reference numeral 37 refers to a disk drive.

Figure 2:
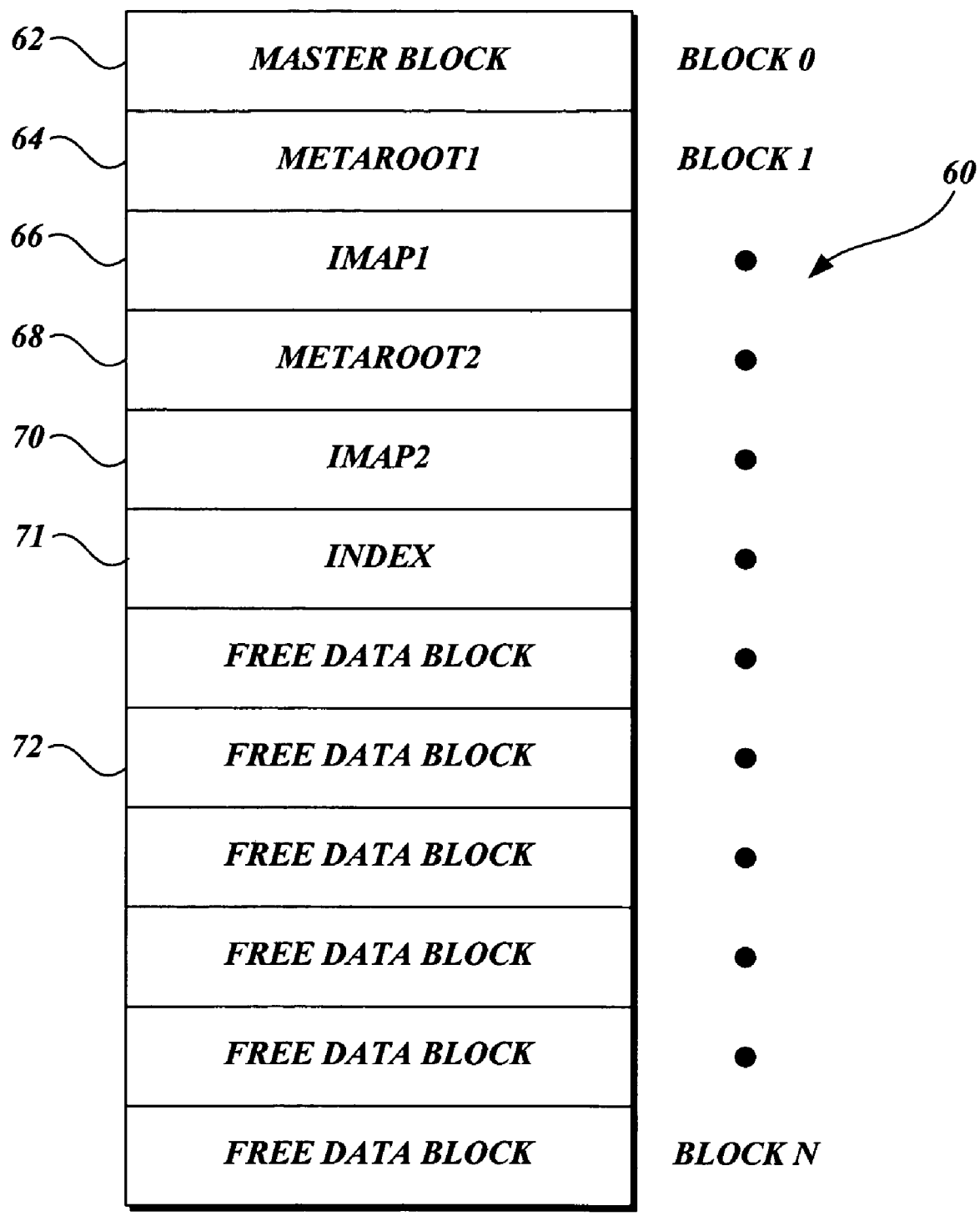
FIG. 2 illustrates an exemplary block formatted file system that may be used with a flash memory and/or a hard drive illustrated in conjunction with the computer system of FIG. 1.

FIG. 2 illustrates an exemplary block formatted file system that may be used with the flash memory 36 and/or the hard drive 37 illustrated in conjunction with the computer system 10 of FIG. 1. The following description will discuss the illustrated file system in conjunction with the flash memory 36. However, the discussion is not limited to the flash memory 36, as the file system is equally applicable to the illustrated disk drive 37, or the like.

As is illustrated in FIG. 2, the block formatted file system 60 includes a plurality of discrete elements. Foremost, the file system 60 includes a master block 62, which is created when the flash memory 36 is formatted. The master block 62 includes pertinent information regarding the specific block size used in the file system 60, the total number of blocks used in the file system 60, and the date the actual file system 60 was formatted. In addition, the master block 62 may also include pointers to other structures incorporated in the flash memory 36. As illustrated in the Figure, the master block 62 resides at block 0; however, the master block 62 may also reside at other locations within the file system 60. The additional blocks in the file system 60 are sequentially ordered starting from the block on which the master block 62 resides (block 0).

The file system 60 also includes two metaroots (metaroot1 64 and metaroot2 68). Each of metaroots hold the logical root data for the flash memory 36, and may also include pointers to other structures incorporated into the file system 60. For example, the metaroots may have pointers that are directed towards an imap1 66 and an imap2 70. Each of the imaps 1 and 2 (66 and 70) contains a bitmap that maps the free and used blocks within a respective root directory (80 and 82). The root directories 80 and 82 are discussed in conjunction with FIG. 3.

An optional index 71 may also be included with the file system 60. The index 71 may function in conjunction with the metaroots1 and 2 (64 and 68) and the imaps1 and 2 (66 and 70). Generally, the index 71 is operationally responsible for enhancing write performance during modifications to the file system data. Additionally, file system 60 includes a plurality of free data blocks 72 that may be used to store information processed and received by the computer system 10.

Additional operational characteristics of the file system 60 will be discussed in conjunction with the exemplary embodiments of the present invention.

Figure 3:
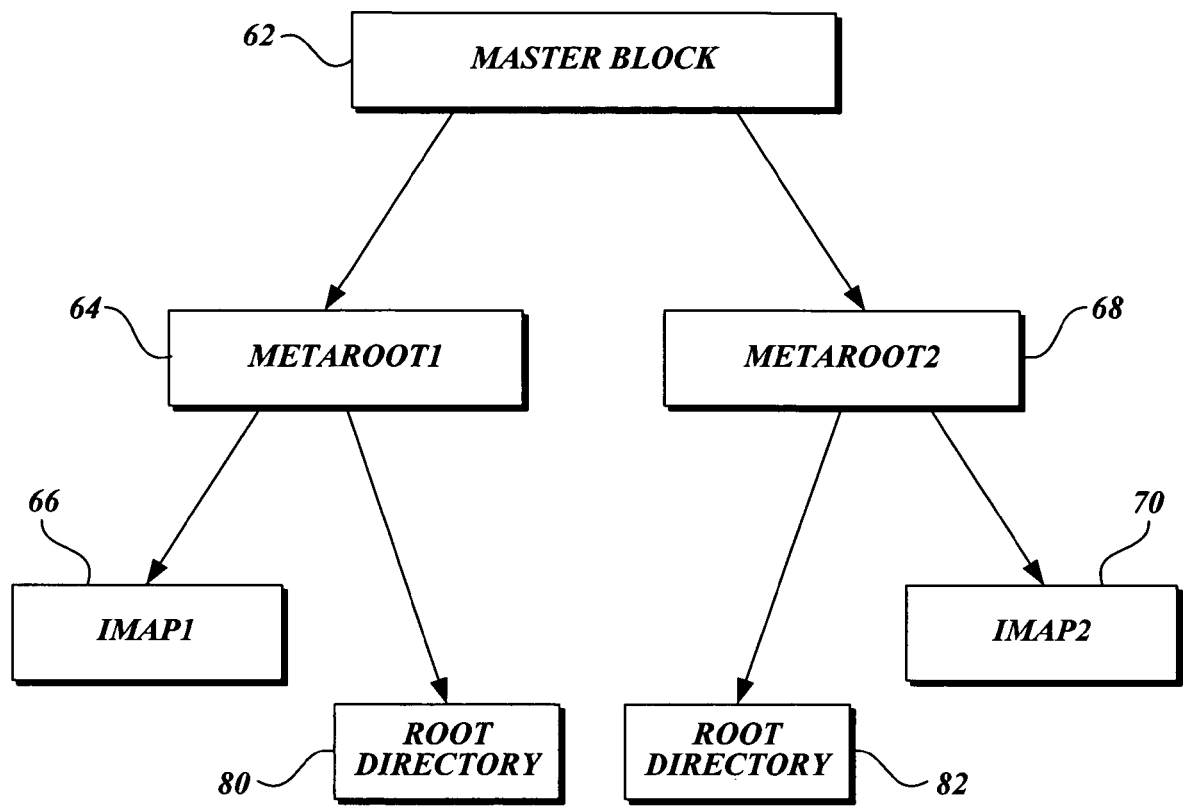
FIG. 3 illustrates the logical structure of the file system illustrated in FIG. 2.

FIG. 3 illustrates the logical structure of the file system 60 illustrated in FIG. 2. The file system 60 operates generally in a logical manner. For example, as is illustrated in FIG. 3, the master block 62 interfaces with the metaroot1 64 and the metaroot2 68. In turn, the metaroot1 64 interfaces with the imap1 66 along with a root directory 80. In a similar fashion, the metaroot2 68 interfaces with the imap2 70 and the root directory 82.

Generally, any given root directory within the file system 60 should contain a plurality of other directories and/or user data files stored as encapsulated and recallable entities. Moreover, in general, a root directory stores information and data saved and retrieved by users of the file system 60. The operational characteristics of root directories are known by those of ordinary skill in the art. Accordingly, an in-depth discussion of those characteristics is not provided for the sake of brevity.

Figure 4:
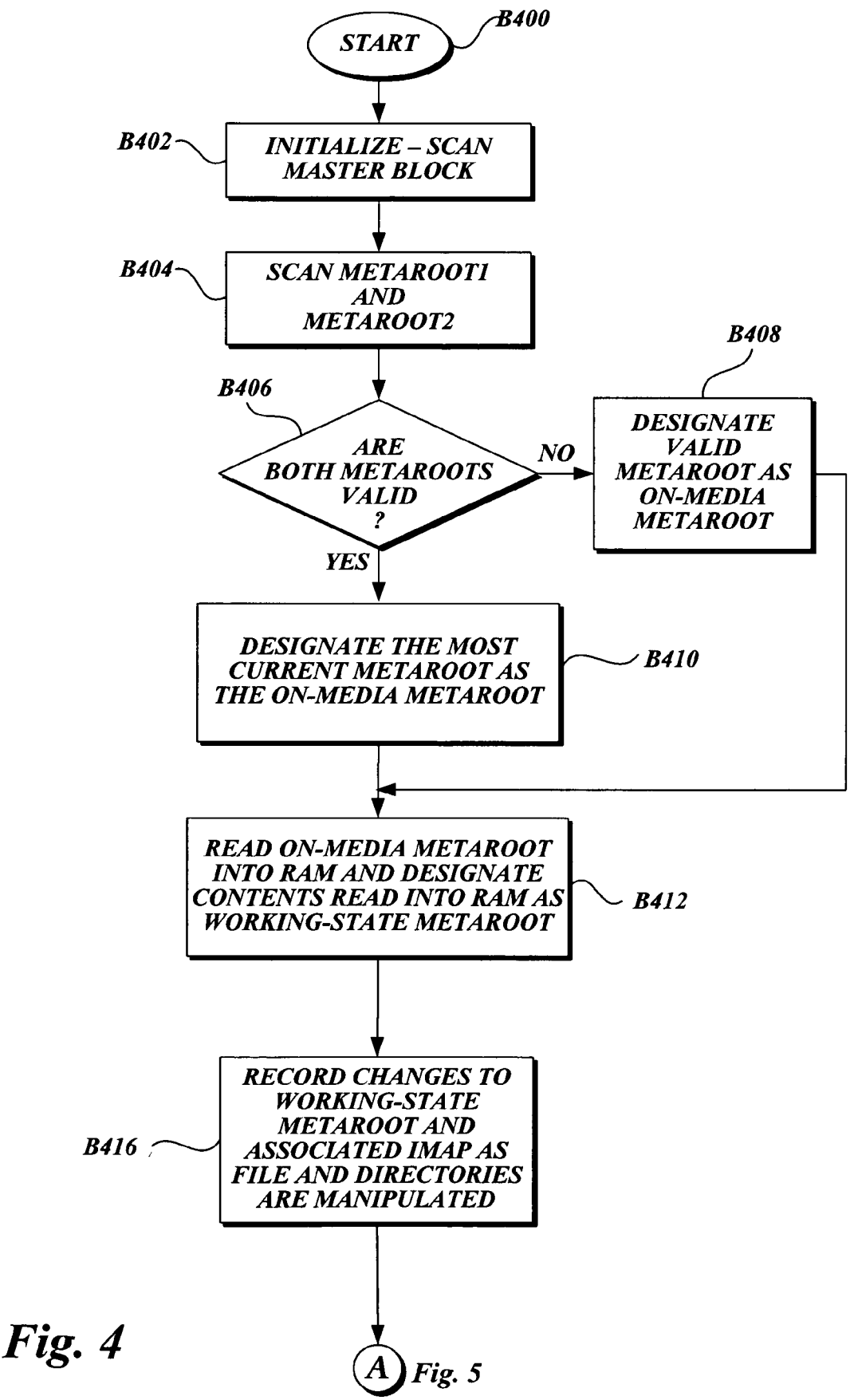
FIG. 4 is a flowchart for a file system routine that may facilitate reliable data storage, in accordance with an exemplary embodiment of the present invention.

FIG. 4 is a flowchart for a file system routine that may facilitate reliable data storage, in accordance with an exemplary embodiment of the present invention. Block B400 represents the beginning of the method illustrated in the figure. Foremost, initialization of the file system 60 occurs when the master block 62 is scanned by the computer system 10. Generally, the process of scanning the master block 62 occurs when the computer system 10 undergoes an initialization process. For example, when the computer system 10 is first turned on, or when the computer system 10 undergoes a boot-up process, the master block 62 is scanned.

Once the master block 62 is scanned, the metaroot1 64 and the metaroot2 68 are scanned (B404). The metaroot1 64 and the metaroot2 68 are used to describe the current state of the file system 60. In particular, only one metaroot (either metaroot1 64 or metaroot2 68) contains a pointer to the on-media root directory (80); this metaroot is referred to as the on-media metaroot (discussed hereinafter in more detail). Moreover, the on-media metaroot (either metaroot1 64 or metaroot2 68) includes pointers to the block size, the number of free blocks, the number used blocks, the number of branched blocks, the number of bad blocks, and so on, of the volume.

Based on the scans of the metaroot1 64 and the metaroot2 68, the validity of the respective metaroots (64 and 68) may be determined (B406). If one of the metaroots (64 and 68) is found to be invalid, the valid metaroot is designated as the on-media metaroot (B411). The designation of the on-media metaroot in the case where one of the metaroots (64 and 68) is found defective involves buffering the information of the valid metaroot in the RAM 35. This buffered information becomes the working-state metaroot (B412).

Returning to Block B406, if the scan of the metaroot1 64 and the metaroot2 68 shows that both metaroots are valid, then the most current metaroot from the metaroot1 64 and metaroot2 68 is designated as the on-media metaroot. The other metaroot is designated as the unused metaroot (B410). Then, as described above, the on-media metaroot is read into RAM 35. The buffered information in RAM 35 is designated as the working-state metaroot (B412).

In one exemplary embodiment of the present invention, the metaroot1 64 and the metaroot2 68 each include an incremental counter. Based on the value of these incrementable counters, it may be determined which of the metaroots (64 or 68) is most current. The metaroot (64 or 68) that has a counter value that is incrementally greater than the other metaroot is the most current metaroot and is designated as the on-media metaroot, and the other metaroot is designated as the unused metaroot (B410). Other markers associated with the metaroots (64 and 68) may also be used when making a determination as to which metaroot is most current.

Once the on-media metaroot, the unused metaroot and the working-state metaroot are established, the file system 60 is ready to provide read-write and copying functionality to a user or a plurality of users that may interface with the file system 60.

Figure 5:
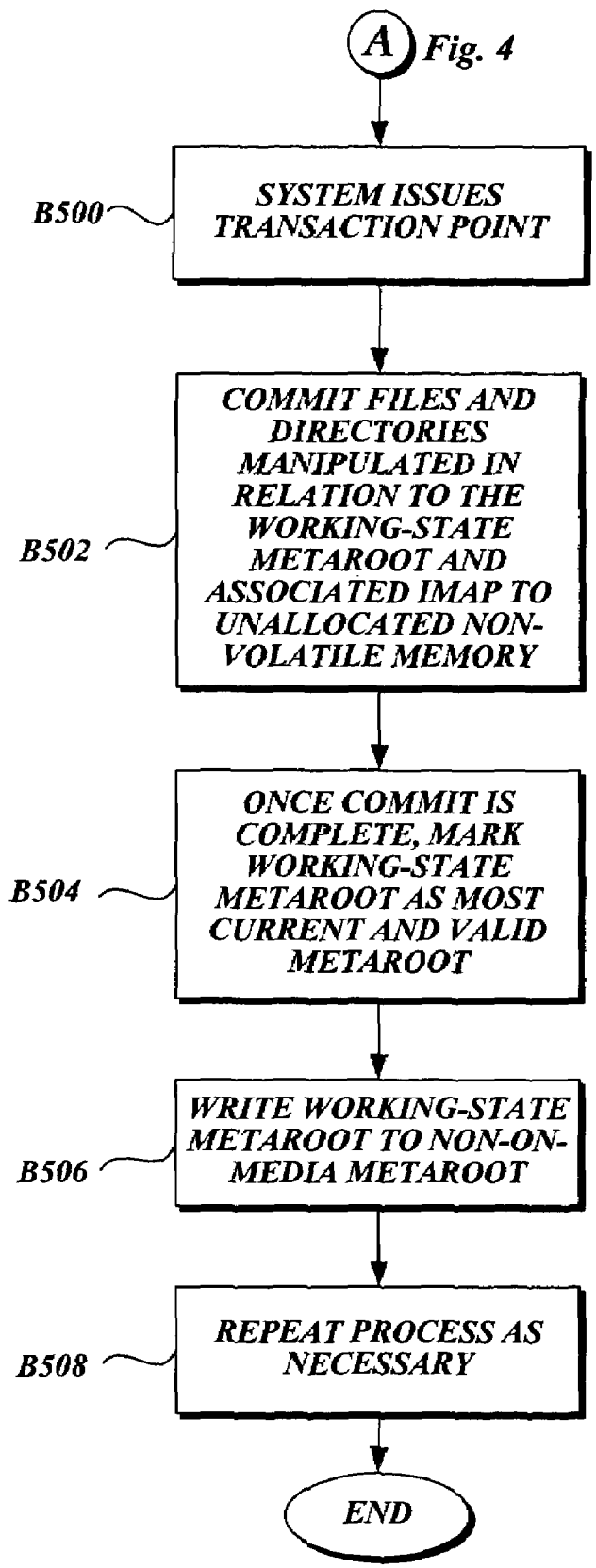
FIG. 5 is a continuation of the flowchart illustrated in FIG. 4.

FIG. 5 is a continuation of the flowchart illustrated in FIG. 4. As changes occur in the file system 60, those changes are accounted for in the working-state metaroot and its associated imap (B500), root directory, other directories and files. Therefore, for example, if the metaroot1 64 was designated as the on-media metaroot, then the imap associated with the working-state metaroot in RAM 35 would be the imap1 66. Alternatively, if the metaroot2 68 was designated as the on-media metaroot, then the imap2 70 would be the associated imap. The associated imap (imap1 66 or imap2 70) is not read into the RAM 35 with the established working-state metaroot. Any required changes to the associated imap will occur on the non-volatile flash memory 36.

As stated, one method of tracking changes that occur in the file system 60, via the working-state metaroot, is to buffer the state of the file system 60 into the RAM 35. Once this occurs, the working-state metaroot resides within the RAM 35. As changes occur in the file system 60, those changes are accounted for by way of the working-state metaroot residing in the RAM 35. In particular, the changes that occur in the file system 60 do not affect the on-media metaroot.

Changes to the file system 60 are continually recorded in the working-state metaroot, the associated imap and unallocated disk sectors, if necessary, until the computer system 10 issues a transaction point (B501). The exact timing that a transition point is issued by the computer system 10 may be dictated by the manner in which the computer system 10 is configured. For example, the computer system 10 may be configured to issue transaction points at predetermined timed intervals. Alternatively, applications running resident in the computer system 10 may also issue transaction points at given intervals.

Once a transaction point is issued, the files and directories that underwent changes as tracked by the working-state metaroot and the associated imap are committed to the flash memory 36 (B502). Once the process of committing the manipulated files and directories is complete, the counter associated with the working-state metaroot, or another indicator associated with the working-state metaroot, is updated (B504). Updating the counter associated with the working-state metaroot effectively designates the working-state metaroot as the most current and the checksum shows validity.

A complete process of committing the manipulated files and directories should be atomic. Atomic means that all of the changes and/or additions that have been tracked by the working-state metaroot are accounted for and committed to the flash memory 36 in memory locations that are designated as free data blocks 72, or unallocated space, within the file system 60. Therefore, once the commit process of Block B504 is complete, the working-state metaroot is written to the unused metaroot, which resides in unallocated space on the non-volatile flash memory 36 (B506). Note, once again, the on-media metaroot is not overwritten during the process of writing the working-state metaroot to the unused metaroot. Once the working-state metaroot is committed to the flash memory 36, the unused metaroot becomes the on-media metaroot (incremental counter is now greater than previous on-media metaroot). The process described in Blocks B500-B506 repeats until the system 10 is powered down.

The operation of the file system 60 described in detail in FIGS. 4 and 5 helps to ensure a consistent and known state of the file system 60 is maintained. For example, if the power to the system 10 is lost while the working-state metaroot is tracking changes in the file system 60, then the on-media metaroot will be the most current metaroot determined after the scan of the metaroot1 64 and metaroot2 68 (B404). That is, the on-media metaroot is always the most current metaroot until the working-state metaroot in RAM 35 is committed the unused metaroot residing on the non-volatile flash memory 36.

Although it should be clear form the above description of the exemplary embodiments of the present invention, when an already existing file and/or data in the file system 60 is accessed and modified during operation, the existing file and/or data of on-media metaroot is not directly modified or changed. The working-state metaroot in RAM 35 monitors the changes that occur to the existing file and/or data, i.e. the working-state metaroot forms a media status indicator. Then, when a transaction point is issued, as discussed above, the changes tracked by the working-state metaroot are written to the unused metaroot, which is allocated in unallocated space on the non-volatile flash memory 36.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method, comprising:
   tracking changes that occur in a file system by way of a media status indicator; and
   maintaining another media status indicator having a known state of the file system until at least substantially all changes to the file system are accounted for by the media status indicator.

2. The method according to claim 1, wherein the media status indicator tracks changes that occur in the file system in a volatile memory.

3. The method according to claim 2, wherein the media status indicator is a working-state metaroot.

4. The method according to claim 1, wherein the another media status indicator is located in non-volatile storage.

5. The method according to claim 4, wherein the another media status indicator is an on-media metaroot.

6. The method according to claim 1, further comprising detecting an event, the event causing commitment of the changes in the file system tracked by the media status indicator to be accounted for in non-volatile storage.

7. The method according to claim 6, wherein the event is a transaction point issued by the file system.

8. The method according to claim 6, further comprising, once all the changes tracked by the media status indicator are committed in the non-volatile storage, marking the media status indicator as valid and current.

9. The method according to claim 8, wherein marking the media status indicator includes incrementing a counter associated with the media status indicator.

10. The method according to claim 9, wherein the media status indicator is a metaroot stored in volatile memory and the another media status indicator is a metaroot stored in non-volatile storage, the metaroot being associated with allocated memory of the non-volatile storage.

11. The method according to claim 10, further comprising writing the metaroot in the volatile memory to an unused metaroot in the non-volatile storage, the unused metaroot being associated with unallocated memory of the non-volatile storage.

12. The method according to claim 11, wherein upon completion of the writing of the metaroot to the unused metaroot, the unused metaroot is the current and valid metaroot in the non-volatile storage.

13. The method according to claim 1, further comprising scanning at least two media status indicators; and designating one of the two status media indicators as the another media status indicator based upon which of the at least two media status indicators is more current.

14. The method according to claim 13, wherein the at least two media status indicators are metaroots each having associated imaps.

15. The method according to claim 13, wherein designating one of the at least two status media indicators as the another media status indicator is based upon which of the at least two status media indicators has a greater counter value.

16. The method according to claim 13, further comprising reading data associated with the another media status indicator into a memory; and designating the contents read into the memory as being associated with the media status indicator.

17. The method according to claim 1, further comprising scanning at least two media status indicators; and designating one of the two status media indicators as the another media status indicator based upon a validity of the at least two media status indicators.

18. The method according to claim 17, further comprising reading data associated with the another media status indicator into a memory; and designating the contents read into the memory as being associated with the media status indicator.

19. An arrangement, comprising:
   at least one volatile memory segment for tracking changes that occur in a file system by way of a media status indicator; and
   at least one non-volatile storage segment for maintaining a known state of the file system until at least substantially all changes to the file system are accounted for by the memory segment for tracking changes that occur in the file system.

20. A method, comprising:
   scanning a first metaroot and a second metaroot;
   designating one of the first and second metaroots as an on-media metaroot based on one of validity and which of the first and second metaroot is more current;
   reading the on-media metaroot into volatile memory;
   designating the contents read into the volatile memory as a working-state metaroot;
   tracking changes that occur in a file system using the working-state metaroot;
   detecting a transaction point;
   committing changes tracked by the working-state metaroot to unallocated non-volatile storage;
   marking the working-state metaroot as current; and
   writing the working-state metaroot to an unused metaroot residing in non-volatile memory.

21. The method according to claim 20, wherein tracking changes includes tracking changes that occur to a file of the file system, the changes that occur to the file being tracked by the working-state metaroot while a version of the file before the changes started to occur is maintained by the on-media metaroot.

* * * * *